United States Patent
Le Clerc et al.

(10) Patent No.: US 10,388,323 B2
(45) Date of Patent: Aug. 20, 2019

(54) METHOD AND APPARATUS FOR DISPLAYING LIGHT FIELD VIDEO DATA

(71) Applicant: THOMSON LICENSING, Issy les Moulineaux (FR)

(72) Inventors: Francois Le Clerc, L'Hermitage (FR); Neus Sabater, Betton (FR); Philippe Schmouker, Betton (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/073,544

(22) Filed: Mar. 17, 2016

(65) Prior Publication Data

US 2016/0275987 A1   Sep. 22, 2016

(30) Foreign Application Priority Data

Mar. 17, 2015 (EP) .................................... 15305390

(51) Int. Cl.
- *H04N 5/77* (2006.01)
- *G11B 27/031* (2006.01)
- *H04N 5/232* (2006.01)
- *H04N 13/111* (2018.01)

(52) U.S. Cl.
CPC ....... *G11B 27/031* (2013.01); *H04N 5/23216* (2013.01); *H04N 5/23229* (2013.01); *H04N 5/23293* (2013.01); *H04N 13/111* (2018.05)

(58) Field of Classification Search
CPC ........... H04N 5/23216; H04N 5/23229; H04N 5/23293; H04N 21/4316; H04N 21/47205
USPC ................................................. 386/223, 226
See application file for complete search history.

(56) References Cited

U.S. PATENT DOCUMENTS

| | | | |
|---|---|---|---|
| 8,446,516 B2 | 5/2013 | Pitts et al. | |
| 8,614,764 B2 | 12/2013 | Pitts et al. | |
| 8,760,566 B2 | 6/2014 | Pitts et al. | |
| 9,069,760 B2* | 6/2015 | Jeong | H04N 1/21 |
| 9,628,839 B1* | 4/2017 | Wodka | H04N 19/597 |

(Continued)

FOREIGN PATENT DOCUMENTS

| | | |
|---|---|---|
| CN | 103417181 | 12/2013 |
| WO | 2015005184 A1 | 1/2015 |

OTHER PUBLICATIONS

Wang et al., "Stereo Vision Based Depth of Field Rendering on a Mobile Device", Digital Photography X, edited by Nitin Sampat et. al., Proceedings of SPIE—IS&T Electronic Imaging, SPIE vol. 9023, 2014, pp. 1-11.

(Continued)

*Primary Examiner* — Helen Shibru
(74) *Attorney, Agent, or Firm* — Tutunjian & Bitetto, P.C.

(57) ABSTRACT

A method and an apparatus for displaying light field video data are described. A receiving unit of the apparatus receives light field video data including a plurality of light field video sequences. Each light field video frames of of the light field video sequences has multiple selectable viewpoints. A light field video frame is provided by an operation unit and displayed on a display device with a first viewpoint. An input unit receives an input indicating a viewpoint different from the first viewpoint. The displayed light field video frame is then displayed with the indicated viewpoint. In one embodiment, two light field video frames of two light field video sequences are displayed respectively in main and side windows on the display device.

11 Claims, 4 Drawing Sheets

(56) References Cited

U.S. PATENT DOCUMENTS

| | | | |
|---|---|---|---|
| 10,066,948 B2* | 9/2018 | Setlur | G01C 21/34 |
| 2005/0219264 A1* | 10/2005 | Shum | G06T 15/205 |
| | | | 345/629 |
| 2006/0028473 A1 | 2/2006 | Uyttendaele et al. | |
| 2010/0125405 A1* | 5/2010 | Chae | G01C 21/3614 |
| | | | 701/532 |
| 2011/0267542 A1* | 11/2011 | Tada | H04N 5/202 |
| | | | 348/672 |
| 2012/0249550 A1* | 10/2012 | Akeley | H04N 5/232 |
| | | | 345/419 |
| 2013/0120546 A1* | 5/2013 | Sung | H04N 13/0438 |
| | | | 348/56 |
| 2013/0120605 A1* | 5/2013 | Georgiev | G06T 15/205 |
| | | | 348/222.1 |
| 2013/0162686 A1 | 6/2013 | Sakakima et al. | |
| 2013/0321586 A1* | 12/2013 | Kirk | G06T 15/04 |
| | | | 348/47 |
| 2013/0329068 A1* | 12/2013 | Hamanaka | H04N 5/23293 |
| | | | 348/218.1 |
| 2014/0035959 A1* | 2/2014 | Lapstun | H04N 13/0402 |
| | | | 345/690 |
| 2014/0092281 A1 | 4/2014 | Nisenzon et al. | |
| 2014/0165111 A1* | 6/2014 | Ko | H04N 21/242 |
| | | | 725/74 |
| 2014/0240463 A1 | 8/2014 | Pitts et al. | |
| 2014/0300646 A1 | 10/2014 | Pitts et al. | |
| 2015/0022655 A1* | 1/2015 | Ruhge | G02B 23/2423 |
| | | | 348/82 |
| 2015/0029379 A1 | 1/2015 | Kim et al. | |
| 2015/0189254 A1* | 7/2015 | Sabater | H04N 13/0257 |
| | | | 348/46 |
| 2015/0189304 A1* | 7/2015 | Bretscher | H04N 19/50 |
| | | | 382/238 |
| 2015/0201176 A1* | 7/2015 | Graziosi | H04N 13/0011 |
| | | | 348/43 |
| 2016/0037052 A1* | 2/2016 | Brunner | H04N 5/23212 |
| | | | 348/353 |
| 2016/0173883 A1* | 6/2016 | Lawrence | H04N 19/14 |
| | | | 348/46 |
| 2017/0192621 A1* | 7/2017 | Leem | G06F 3/0481 |
| 2019/0068973 A1* | 2/2019 | Hamilton | H04N 19/132 |

OTHER PUBLICATIONS

Anonymous, "Lightfield Cameras in Color+Light+Symbol+Al", http://nb.dropmark.com/89973/1342251, Nov. 3, 2012, pp. 1.

Tompkin et al., "Videoscapes: Exploring Sparse, Unstructured Video Collections", ACM Transactions on Graphics, vol. 31, No. 4, Aug. 2012, pp. 1-12.

Smeulders et al., "Visual Tracking: An Experimental Survey", IEEE Transactions on Pattern Analysis and Machine Intelligence, vol. 36, No. 7, Jul. 2014, pp. 1442-1468.

Smith et al., "Light Field Video Stabilization", IEEE International Conference on Computer Vision (ICCV), Kyoto, Japan, Sep. 27, 2009, pp. 1-8.

Bagri et al., "A scalable framework for joint clustering and synchronizing multi-camera videos", 21st European Signal Processing Conference (EUSIPCO 2013), Marrakech, Morocco, Sep. 2013, pp. 1-6.

* cited by examiner

METHOD AND APPARATUS FOR DISPLAYING LIGHT FIELD VIDEO DATA

This application claims the benefit, under 35 U.S.C. § 119 of European Patent Application No. 15305390.5, filed Mar. 17, 2015.

TECHNICAL FIELD

The present invention relates to a method and an apparatus for displaying light field video data, particularly with different viewpoints of the light field video data. The invention also relates to a computer readable medium suitable for such a method and an apparatus.

BACKGROUND

Light field capture data, which can be captured for example by a plenoptic camera or an array of cameras, allows refocusing of the capture after the snapshot, estimating the depth of the scene in the capture, and many other flexible editing options for the capture data. In order to visualize such light field content, several user interfaces have been proposed to display and enable an operator to review and edit individual images of the light field capture [1].

Besides individual light field images, there are already devices able to capture light field videos, for example, the Raytrix plenoptic camera. It can be expected that more light field videos will be available and used in the near future. However, the existing user interfaces are only applicable to the visualization of light field images and are not designed to visualize light field videos. There is a need for a solution that enables users to review and make use of light field videos.

SUMMARY

Therefore, it is an objective to propose solutions for displaying and visualizing light field video data. The proposed method and system provide solutions for displaying light field video data, as well as easy and intuitive navigation for reviewing the same.

According to one embodiment, a method for displaying light field video data is proposed. The light field video data includes a plurality of light field video sequences. Each light field video frame of the light field video sequences has multiple selectable viewpoints. The method comprises: receiving the light field video data including a plurality of light field video sequences; displaying a first light field video frame of a first light field video sequence with a first viewpoint; receiving an input indicating a viewpoint of the first light field video frame different from the first viewpoint; and in response to the indicating input, displaying the first light field video frame with the indicated viewpoint.

In one embodiment, the light field video frames of the first light field video sequence are temporally sequenced, and the method comprises: in response to the indicating input, displaying the light field video frames of the first light field video sequence temporally subsequent to the first light field video frame with the indicated viewpoint.

In one embodiment, the received input indicating the viewpoint is generated by selecting a region of the displayed first light field video frame corresponding to the indicated viewpoint.

In one embodiment, the first light field video frame of the first light field video sequence is displayed in a main window on a screen. The method further comprises displaying a second light field video frame of a second light field video sequence with a second viewpoint in a side window on the screen.

In one embodiment, the first and second displayed light field video frames are synchronized temporally or by other selectable characteristics derived from the contents of the light field video data.

In one embodiment, the method further comprises: receiving an input selecting the displayed second light field video frame with the second viewpoint in the side window; and, in response to the selecting input, (a) displaying the second light field video frame with the second viewpoint in the main window, replacing the first light field video frame, when the second viewpoint is in close proximity to the first viewpoint, or (b) displaying the first light field video frame in the main window with a changing viewpoint, producing a smooth transition over time between the first and second viewpoints, when the second viewpoint is not in close proximity to the first viewpoint. Smoothing can either be linear or done according to some user-defined curve, spline, etc. that will slow down or accelerate the transition from first viewpoint to the second viewpoint over time.

According to one embodiment, an apparatus configured to provide light field video data to a display device is introduced. The apparatus comprises a receiving unit, an operation unit, an input unit, and optionally a storage unit. The receiving unit is configured to receive light field video data including a plurality of light field video sequences. Each light field video frame of the light field video sequences has multiple selectable viewpoints. The storage unit is configured to store the received light field video data. The operation unit is configured to provide a first light field video frame of a first light field video sequence with a first viewpoint to a display device. The input unit is configured to receive an input indicating a viewpoint of the first light field video frame different from the first viewpoint. The operation unit is configured to provide the first light field video frame with the indicated viewpoint to the display device in response to the indicating input.

In one embodiment, the light field video frames of the first light field video sequence are temporally sequenced, and the operation unit is configured to provide the light field video frames of the first light field video sequence temporally subsequent to the first light field video frame to the display device with the indicated viewpoint in response to the indicating input.

In one embodiment, the operation unit is configured to provide a second light field video frame of a second light field video sequence with a second viewpoint to the display device. Preferably, the operation unit is configured to temporally synchronize the first and second light field video frames.

In one embodiment, the input unit is configured to receive an input selecting the second light field video frame with the second viewpoint. The operation unit is configured to, in response to the selecting input, provide to the display device (a) the second light field video frame with the second viewpoint when the second viewpoint is in close proximity to the first viewpoint, or (b) the first light field video frame with a changing viewpoint, producing a smooth transition between the first and second viewpoints, when the second viewpoint is not in close proximity to the first viewpoint.

Also, a computer readable storage medium has stored therein instructions enabling displaying light field video data, which, when executed by a computer, cause the computer to: receive light field video data including a plurality of light field video sequences; display a first light field video frame of a first light field video sequence with a first viewpoint; receive an input indicating a viewpoint of the first light field video frame different from the first viewpoint; and in response to the indicating input, display the first light field video frame with the indicated viewpoint.

The computer readable storage medium can be a non-transitory volatile or non-volatile storage medium, such as, for example, a hard disk, an optical or magnetic disk or tape, a solid state memory device, etc. The storage medium thus tangibly embodies a program of instructions executable by a computer or a processing device to perform program steps as described herein.

BRIEF DESCRIPTION OF THE DRAWINGS

For a better understanding the proposed solutions shall now be explained in more detail in the following description with reference to the figures. It is understood that the solutions are not limited to this disclosed exemplary embodiments and that specified features can also expediently be combined and/or modified without departing from the scope of the proposed solutions as defined in the appended claims.

FIG. 5 displayed on a display device according to one embodiment of the method.

DETAILED DESCRIPTION OF PREFERRED EMBODIMENTS

The term "light field video data" (hereinafter LF video data) used in the description should be understood as generally defined in the field, i.e. 4D video data comprising, at any instant, angular and spatial information about all the light rays at every point travelling in every direction in a space scene, and can be captured by, for example, a plenoptic video camera, a video camera array, or any other feasible camera device.

Figure 1:
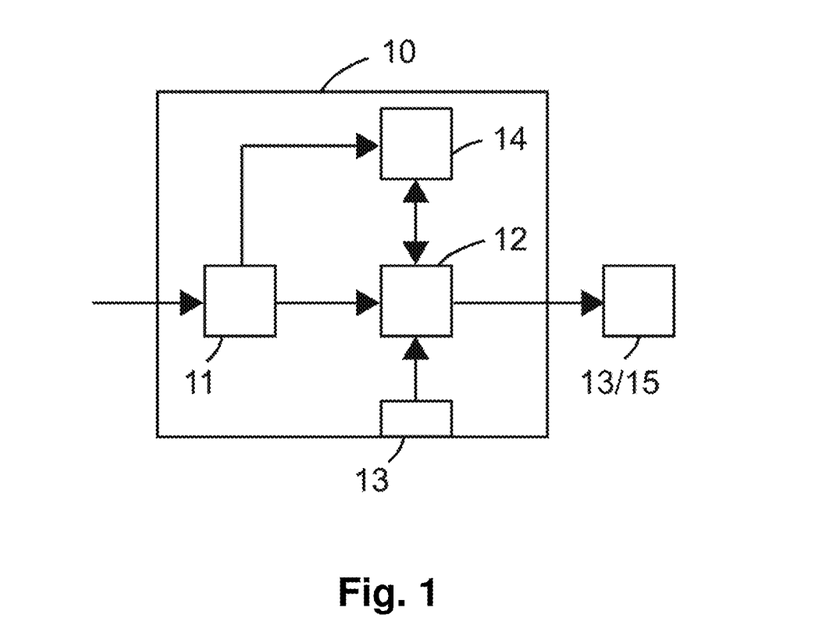
FIG. 1 is a schematic diagram illustrating an exemplary embodiment of an apparatus configured to provide light field video data to a display device.

FIG. 1 schematically illustrates an exemplary embodiment of an apparatus 10 configured to provide light field video data to a display device 15. The apparatus 10 comprises a receiving unit 11, an operation unit 12, an input unit 13 and optionally a storage unit 14.

The receiving unit 11 is configured to receive LF video data including a plurality of LF video sequences. Each frame of the LF video sequences has multiple selectable viewpoints. The LF video data can be captured and provided by a plenoptic camera to the apparatus 10. In alternative, the receiving unit 11 can retrieve and receive the LF video data from a database (not shown).

The received LF video data can be optionally stored in a storage unit 14, which can be any feasible and suitable memory device and can be either integrated in or supplementary to the apparatus 10.

The operation unit 12 is configured to retrieve light field video frames from the receiving unit 11 or the storage unit 14 and to provide the same to a display device 15. The display device 15 can be a display unit integrated in the apparatus 10 or an external display device outside the apparatus 10. The display device 15 can be, for example, a television, a computer screen, a mobile device with display capabilities, etc.

The input unit 13 is configured to receive an input from a user or an operator choosing and indicating viewpoints of the LF video frames. A user can indicate a specific viewpoint of a certain LF video frame via the input unit 13. In response to and according to the input instruction, the operation unit 12 is configured to retrieve the chosen LF video frame with the indicated viewpoint and to provide the same to the display device 15. The input unit 13 provides an interface enabling a user to interact with and control the apparatus 10. The types and the design of the input unit 13 can be flexible and varied for different demands and purposes.

Preferably, the operation unit 12 is further configured to provide multiple LF video frames temporally subsequent to the chosen LF video frame to the display device 15 in response to the indicating input, all of which being with the indicated viewpoint.

Optionally, the input unit 13 can be combined with the display device 15. For example, the display device 15 can be a touch screen that displays the LF video frames and at the same time enables a user to enter an input. In this case, a user can indicate the viewpoint of a video frame directly using the touch screen 15, rather than using a supplementary input unit 13.

In one embodiment, the operation unit 12 is configured to provide a first LF video frame of a LF field video sequence with a first viewpoint and a second LF video frame of a second LF video sequence with a second viewpoint to the display device 15. Preferably, the first and second LF video frames are temporally synchronized by the operation unit 12.

More details about the operation of the apparatus 10 will be described below together with the proposed methods for displaying LF video data. Of course, the apparatus 10 can optionally comprise any other additional or alternative devices for the implementation of the embodiments of the following proposed methods.

Figure 2:
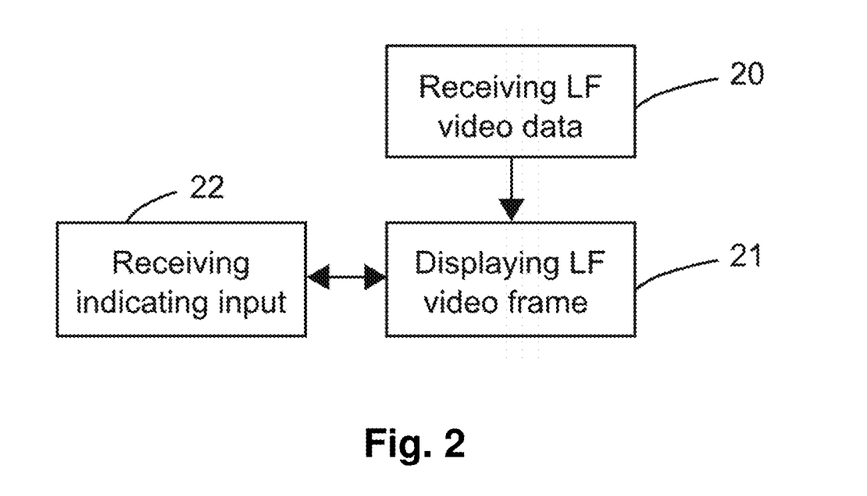
FIG. 2 is a flow chart illustrating a preferred embodiment of a method for displaying light field video data.

FIG. 2 schematically illustrates a preferred embodiment of the method for displaying LF video data. The LF video data discussed herein preferably includes a plurality of LF video sequences, and each LF video frame of the LF video sequences has multiple selectable viewpoints. The method comprises: receiving 20 the LF video data; displaying 21 a first LF video frame of a first LF video sequence with a first viewpoint; receiving 22 an input indicating a viewpoint of the first LF video frame different from the first viewpoint; and, in response to the indicating input, displaying 21 the LF video frame with the indicated viewpoint.

Referring to FIG. 1, one preferred embodiment of the method will be further explained in detail below using the exemplary embodiment of the apparatus 10. It should be understood that the method can be implemented in any other suitable systems or apparatuses known and available in the field.

The receiving unit 11 of the apparatus 10 receives 20 the LF video data includes one or more LF video sequences from a camera or a LF video database. Each of the LF video sequences includes a plurality of LF video frames having multiple selectable viewpoints. For example, for an event such as a football game or a wedding, several LF video sequences relating to a same event will be available from different sources or cameras. Preferably, these LF video sequences are related to each other in certain content, and there are some semantical similarities among them.

The received LF video data can be optionally stored in the storing unit 14 and be used afterwards. The operation unit 12 retrieves the LF video data and the LF video sequences and frames thereof and provides the same to the display device 15, e.g., a screen, to be displayed 21.

Figure 3:
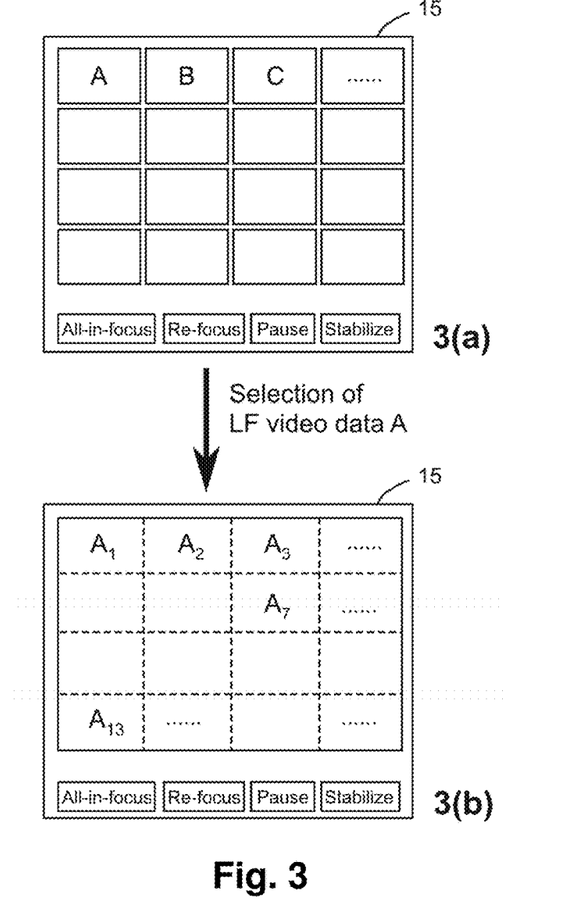
FIG. 3 schematically illustrates an exemplary display of light field video data on a display device according to an embodiment of the method.

Preferably, the default display of the LF video data shows multiple LF video sequences respectively. In particular, each of the LF video sequence is displayed 21 in a certain window or area on a screen 15. FIG. 3(*a*) schematically illustrates one exemplary default display of multiple LF video sequences on a screen 15. Sixteen LF video data A, B, C, etc., are shown on the screen 15, where each one is displayed 21 in a respective rectangular window. The LF video sequences can be shown dynamically with a continuous video stream or be represented by one LF video frame of the corresponding LF video sequence. Preferably, the LF video sequences are displayed 21 all-in-focus in the default display. Of course, the amount of the LF video sequences shown in the default display is flexible and can be changed and arbitrarily chosen by a user for different demands and preferences.

In order to display one specific LF video sequence shown in the default display, a user can enter an input indicating a chosen LF video sequence via the input unit 13 of the apparatus 10 or directly via the screen 15 if it is a touch screen. The selection of one specific LF video sequence can be easily performed by, for example, using a mouse and a corresponding cursor on the screen 15 to click on the window of the target LF video sequence. When the screen 15 is a touch screen, the user can touch the window directly with his/her fingers. Any other existing and general remote control and/or user input devices can be used as well.

Referring to FIG. 3(*b*), the display of the LF video data "A" on the screen 15 is schematically illustrated, in response to an input indicating a selection of the LF video sequence A. A first LF video frame of the LF video sequence A with a first viewpoint is displayed 21 as a default setting, which is preferably the viewpoint closest to the average viewpoint of the corresponding LF video sequence. For example, the LF video sequence A can be displayed with the viewpoint $A_1$ as a default. Without a further input and/or instruction, it is preferred that the LF video sequence A is displayed frame by frame with the default viewpoint $A_1$. In other words, the LF video data A is displayed as a video stream on the screen 15 with the viewpoint $A_1$.

The multiple selectable viewpoints for a LF video sequence and the frames thereof are one of the advantages and improvements of LF video data. Accordingly, in the preferred embodiment of the proposed method for displaying LF video data, the viewpoint of a displayed LF video sequence is especially selectable and changeable. For example, as shown in FIG. 3, several selectable viewpoints associated with the video sequence A are shown on the screen 15. In this example, sixteen viewpoints $A_1$, $A_2$, $A_3$ . . . are available for a user to select from. It should be understood that the amount of the available viewpoints is not limited and can be flexibly decided.

A user can enter an input indicating and selecting one specific viewpoint of the displayed first LF video frame of the LF video sequence A. For example, the input can indicate the viewpoint $A_7$, which is different from the default viewpoint $A_1$. In response to the reception 22 of the indicating input, the operation unit 12 provides the first LF video frame with the indicated viewpoint $A_7$ to the display device 15. Then the first LF video frame of the LF video sequence A is displayed 21 with the indicated viewpoint $A_7$ on the screen 15.

Figure 4:
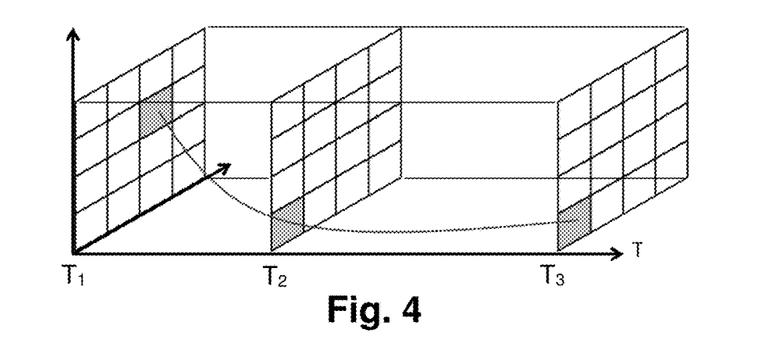
FIG. 4 schematically illustrates a viewpoint trajectory of the display of LF video data according to one embodiment of the method.

FIG. 4 shows a viewpoint trajectory of the display of the exemplary LF video sequence A. At timing $T_1$ the first LF video frame of the LF video sequence A is displayed with the viewpoint $A_7$ according to the reception 22 of the indicating input as described above. At a following timing $T_2$ when a subsequent video frame is displayed, a user enters an input to indicate and select another viewpoint $A_{13}$, resulting in the display of this LF video frame with the indicated viewpoint $A_{13}$. If no further input is received, as shown in FIG. 4, the LF video sequence A is continuously displayed frame by frame with the last viewpoint $A_{13}$. In other words, the LF video frames of the LF video sequence A are displayed in a temporal order with the indicated viewpoint.

According to the preferred embodiment of the proposed method, a user can change the viewpoint of the display of the LF video sequences at any time. It should be noted that the division of the screen 15 to show the selectable viewpoints can be either visible or invisible for the user. The dotted lines and areas marked in grey in FIGS. 3 and 4 are used here merely for a clear explanation in the description and do not need to be visible on the screen 15. A user can also select the viewpoints without the visualization of the viewpoints simply by clicking on and indicating a specific area or region of the displayed LF video frame corresponding to a specific viewpoint. For example, a user can be educated previously about the setting and visualization of the LF video sequences on the screen 15, in which case the user would know how to enter an input to indicate a preferred viewpoint.

Alternatively, when the display device 15 is a touch screen, the user can select a new viewpoint using a swiping finger gesture on the input unit 13. The processing unit 12 then determines the new viewpoint based on the direction and amplitude of the swipe gesture. Specifically, the new viewpoint is chosen in such a way that the direction of the viewpoint change between the initial viewpoint and the newly selected viewpoint matches the direction of the swipe gesture, and that the amplitude of the viewpoint change is proportional to the amplitude of the swipe gesture.

In addition to the selection and change of the viewpoints of the displayed LF video sequences, the focus of the same can also be chosen and changed. In one embodiment, the LF video sequences are displayed all-in-focus on the screen 15, preferably as a default display of the LF video sequences. In another embodiment, a user can decide which object to be focused in one LF video sequences and/or where is the focus plane in the scene in the LF video sequences by indication operations similar to those described above. Specifically, the user can select one area or one object in the displayed LF video sequences by the input unit 13 or directly touching a touch screen 15 when it is feasible. This refocusing operation can be triggered by a selection of the "Re-focus" item shown on the screen 15. A gyroscope can also be used in order to change the focus of the displayed LF video data.

In one embodiment, a user can also pause the display of the LF video data. For example, referring to FIG. 3, a user can trigger the pause operation by clicking on the "pause" item shown on the screen 15. With the possibility to pause the display of the LF video sequences, it becomes easier for a user to change the viewpoints or the focus during the pause, which is especially interesting regarding a sport LF video or a LF video with changing content. The user can stop the display of a LF video sequence when an action of interest is performed, e.g., a goal attempt in a football game, and change the viewpoint and/or the focus of the displayed frame. In this way, the user can further enjoy the video LF data with a preferred viewpoint and focused region, which improves the viewing experience. Of course, the pause operation can be performed differently depending on different apparatus 10, the input unit 13 thereof, and the display device 15. For example, when the display device 15 is a touch screen, the user could pause the display by simply double touching the screen 15.

In one embodiment, a function of stabilization can also be activated and/or triggered by a user, for example, by selecting the "Stabilize" item displayed on the screen 15 as shown in FIG. 3. In this way, angular information can be used to remove a shaky movement of a LF video sequence captured by a hand-held camera, which can be performed, for example, by using available methods in the field [II].

In one embodiment, the user can focus his/her attention on a particular object of interest in the scene captured by the LF camera. In this case, it is preferred to provide an operation for drawing a bounding box around a target object of interest in some reference LF views, preferably near the central viewpoint, and tracking the bounding box throughout several views, based on LF calibration data and visual tracking methods available and known in the field [III]. Relying on the object tracking information, the operation unit 12 of the apparatus 10 can generate from one target LF video sequence a monocular video where the object of interest is located as close as possible to the center of the displayed LF video sequence or to its initial position in the reference view. This can be achieved by dynamically selecting the appropriate viewpoint, among those made available by the light LF video data.

Specifically, the bounding box drawn by the user in at least one reference view provides a template image patch. This same image patch is also present in the other views of the LF data, but at displaced locations with respect to the reference view, because of the change of the viewpoint. The displacement of the image patch between the reference view and any other view available in the light field sequence can be estimated by methods known from the state of art and described in [III], such as normalized cross-correlation. Considering a given second view different from the reference view, adding as a vector the computed displacement for the second view to the location of the patch center in the reference view yields an estimate of the location of the template patch in the second view. In the proposed embodiment, the new viewpoint is computed by selecting, among all available views in the LF sequence, the view for which the computed location of the center of the template image patch is closest to the center of the image.

Furthermore, this bounding box, once tracked, may be used to automate the modification of the viewpoint in successive LF video frames. In other words, the new viewpoints in successive frames will be the ones on which the best focus can be found within the tracked bounding box. This way, the viewpoints will always be focused on the tracked object of interest.

In another preferred embodiment of the proposed method, the first LF video frame of the first LF video sequence is displayed in a main window on the screen 15. The method further comprises displaying 21 a second light field video frame of a second light field video sequence with a second viewpoint in a side window on the screen.

Figure 5:
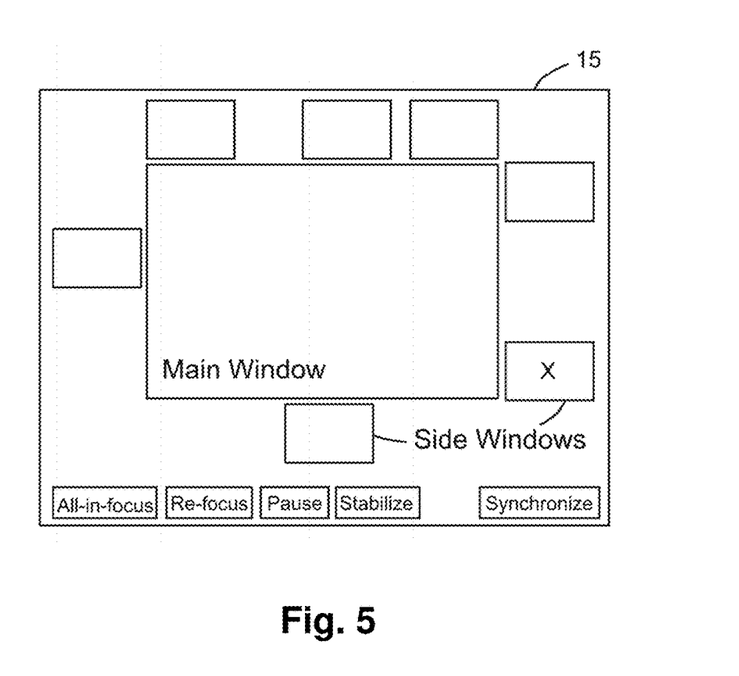

FIG. 5 schematically illustrates the described main and side windows displayed on an exemplary screen 15 in a preferred embodiment of the proposed method. In this exemplary illustration, one main window and seven side windows are shown, which are in the shape of rectangles. Of course, the size, shape, and the amount of the main and side windows are flexible and not limited. Accordingly, the amount of the LF video data shown in the side windows is also not limited and can be flexibly decided. Preferably, the size of the main window is larger than the size of the side windows, and the main window is positioned closer to the center of the screen than the side windows. In this way, the main window can be more easily seen by a user and attracts more attention than the side windows.

Preferably, the displayed first and second LF video frames of the first and second LF video sequences have similar content or at least some similar objects in the video sequences. In addition, the relative position of the main window and the side windows on the screen 15 is preferably related to the content of the first and second LF video frames displayed therein, respectively. For example, a second LF video frame X is displayed and placed at the right-hand side of the main window when there is a right displacement between the viewpoint of the first LF video frame displayed in the main window and the viewpoint of the second LF video frame X displayed in the side window. The side windows placed at the top, bottom or left-hand side of the main window are similarly arranged.

In alternative, the main and side windows can also be arranged according to other similarities between the displayed first and second LF video frames, such as colorimetry of the frames, global shapes similarities, time similarities, detected moves similarities, environment similarities, presence of same people in the frames as evidenced by face detection and face recognition, specified or detected objects similarities, etc. In addition, the similarities can also be defined and decided by the operation unit 12 of the apparatus 10 according to any suitable and feasible parameters and/or metadata acquired together with the LF video data.

In one embodiment, the first and second displayed LF video frames are preferably temporally synchronized, i.e. the displayed first and second LF video frames have a same timecode and/or have been captured at a same time. The synchronization of the displayed LF video frames can also be performed according to other characteristics of the video frames, such as capturing locations, people in the frames, audio, etc [IV]. The synchronization can be easily activated or deactivated by a user selecting the "synchronize" item on the screen 15 using the input unit 13 of the apparatus 10 or the display device 15 directly, similar to the activation/deactivation of other functions as described above.

Moreover, the first and second LF video frames can be optionally displayed all-in-focus, preferably as a default display. The focus of the displayed LF video frames can be arbitrarily changed and selected as described above with the use of the "Re-focus" item shown on the screen 15.

Figure 6:
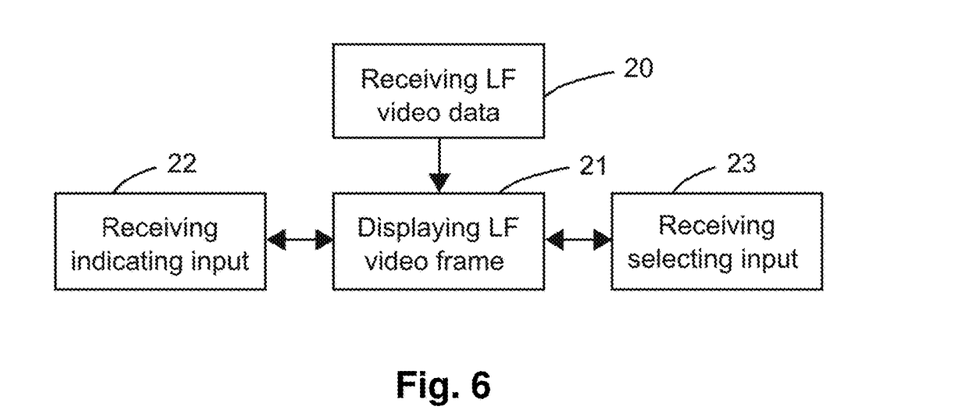
FIG. 6 is a flow chart illustrating another preferred embodiment of a method for displaying light field video data.
Figure 7:
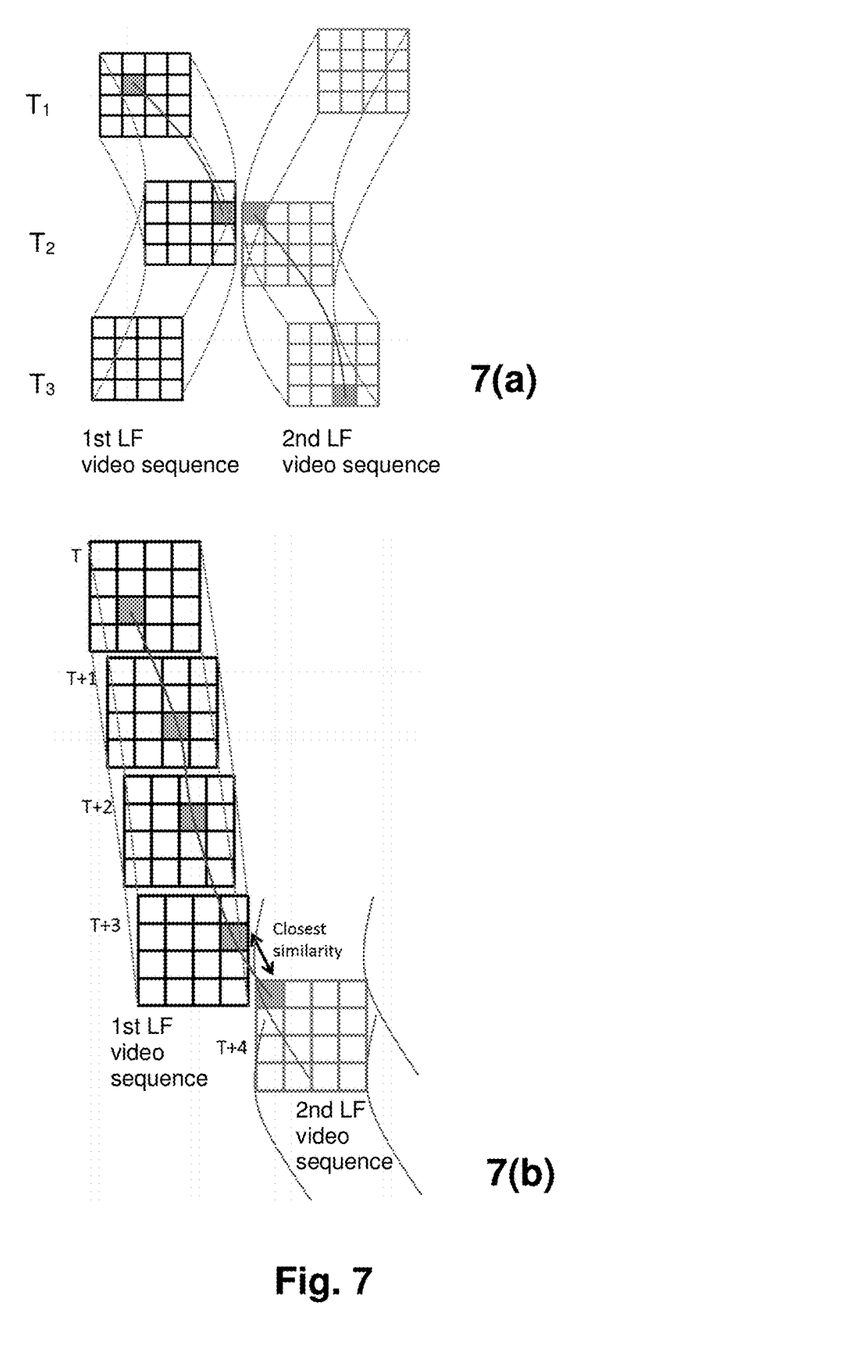
FIG. 7 schematically illustrates the display transition from one light field video data to another light field video data according to one embodiment of the method.

Referring to FIG. 6, in one preferred embodiment, the method further comprises: receiving 22 an input indicating a viewpoint of the displayed first LF video frame in the main window; receiving 23 an input selecting the displayed second LF video frame with the second viewpoint in the side window; and in response to the selecting input, (a) displaying 21 the second LF video frame with the second viewpoint in the main window, replacing the first LF video frame, when the second viewpoint is in close proximity to the first viewpoint, or (b) displaying 21 the first LF video frame in the main window with a changing viewpoint when the second viewpoint is not in close proximity to the first viewpoint. The transition from one LF video data to another LF video data is denoted as "Video Jump" hereinafter, of which the transition path is schematically illustrated in FIG. 7 in detail.

FIG. 7(a) illustrates the first situation, where the second viewpoint of the second LF video frame (right-hand side) displayed in the side window is in close proximity to the first viewpoint of the first LF video frame (left-hand side) displayed in the main window. At the time instant $T_1$, the first LF video sequence is displayed in the main window on the screen with a specific viewpoint (marked in grey in the figure). At timing $T_2$, the displayed viewpoint of the first LF video sequence is changed by using, for example, the method described above. The changed viewpoint is then in close proximity to a viewpoint of the second LF video frame of the second LF video sequence, which is displayed in a side window next to the main window on the screen 15. In this case, in response to a user input selecting the second LF video frame, the corresponding second LF video sequence can be displayed in the main window, replacing the first LF video sequence. Accordingly, at timing $T_3$, the second LF video sequence is displayed in the main window (possibly with a same second viewpoint or a further changed viewpoint as shown in the figure), and the first video sequence is preferably displayed in a side window instead.

The selection of the second LF video sequence can be performed, for example, via the exemplary input unit 13 of the apparatus 10. In the case where the display device 15 is a touch screen, a user can simply click on the side window displaying the second LF video sequence and sweeps it to the main window. It is preferred that the Video Jump operation is seamless, which means that the display of the first LF video sequence in the main window is not paused during the transition of the display from the first LF video sequence to the second LF video sequence. A gyroscope can also be used for such a seamless Video Jump operation.

FIG. 7(b) shows another situation, where the second viewpoint of the selected second LF video frame of the second LF video sequence is not in close proximity to the first viewpoint of the displayed first LF video frame of the first LF video sequence at the time of the selection of the Video Jump operation. In this case, it is still preferred that the transition of the LF video sequences is performed smoothly in terms of viewpoints. That is, the first LF video sequence is displayed in the main window with a changing viewpoint until the viewpoint of the first LF video sequence is in close proximity to the second viewpoint of the second LF video sequence. As shown in FIG. 7(b), the Video Jump operation is triggered at T, resulting in a changing viewpoint of the first LF video data throughout the timings T+1, T+2 and T+3. At the timing of T+3, the viewpoint of the first LF video sequence becomes in close proximity to the second viewpoint of the displayed second LF video sequence, which leads to the display of the second LF video sequence in the main window as described in the previous situation.

In one embodiment, the Video Jump operation can also be performed with the pause function as described above. For example, in the case of a goal attempt in a soccer game, a user might want to watch other LF video data from other viewpoints capturing the same goal post. In this case, the Video Jump is also possible to be operated within the pause mode. In other words, the Video Jump operation can also be performed with the pause operation. The transition of the LF video sequences is still preferably performed smoothly in terms of viewpoints. When the LF video is played again, the visualization starts from the last LF video sequence watched.

In one embodiment, the proposed method for displaying LF video data can be used integrated with available broadcasting techniques and methods. For example, when a user can get access to a set of broadcast LF videos that are related to a same live event, e.g. a soccer match, a Formula 1 Race, a stage of the Tour de France, etc., the proposed method can be applied and implemented provided that the display apparatus embeds multiple tuners and time-shifting features. The display and navigation among the several broadcast LF video signals is possible, as well as the "pause" and other operations mentioned above. One exemplary case is that when the user browses the LF videos or manipulates them during a "pause" operation, the broadcast live LF video signals can be recorded and played back or resumed at a later time.

In one embodiment, the proposed method for displaying LF video data can be used by a content provider to edit broadcast or broadband content. On the back-end side of a professional services provider, many LF video data can be used as inputs to edit final LF video data. These final video data can then either be stored for later broadcast/broadband or can be broadcast on the fly, with maybe time shifting. Furthermore, once final LF video data have been edited the end-user, professional as well as consumer one, can either receive the final LF video data on a broadcast channel or request for its playing on demand via a broadband channel.

REFERENCE

[I] LightField Forum http://nb.dropmark.com/89973/1342251

[II] B. M. Smith, et al., "Light Field Video Stabilization", IEEE International Conference on Computer Vision (ICCV), 2009

[III] A. W. M. Smeulders, et, al. "Visual Tracking: An Experimental Survey", IEEE Transactions on Pattern Analysis and Machine Intelligence, Volume: 6, Issue: 7, 2014

[IV] A. Bagri, et al., "A Scalable framework for joint clustering and synchronizing multi-camera videos", $21^{st}$ European Signal Processing Conference (EUSIPCO 2013), September 2013

The invention claimed is:

1. A method for operating a transition between two light field videos, comprising:
   receiving light field video data from two light field video sequences having temporally synchronized video frames, each video frame comprising multiple selectable viewpoints;
   displaying, in a first window, temporally subsequent first light field video frames of a first light field video sequence from said two light field video sequences, each of said first light field video frames comprising multiple selectable first viewpoints of said first light field video sequence;
   displaying, in a second window, temporally subsequent second light field video frames of a second light field video sequence from said two light field video sequences, each of said second light field video frames comprising multiple selectable second viewpoints of said second light field video sequence;
   receiving a selection of a first viewpoint of a displayed first light field video frame of said first light field video sequence;

receiving a selection of a second viewpoint of a displayed second light field video frame of said second light field video sequence, said selected second viewpoint not being in viewpoint proximity of said selected first viewpoint; and in response to the selection of the second viewpoint, displaying, in the first window, temporally subsequent light field video frames of the first light field sequence with a changing first viewpoint until a first viewpoint of said first light field video sequence is in viewpoint proximity of the second viewpoint of said second light field video sequence, and displaying, in the first window, temporally subsequent light field frames of the second light field video sequence with the second viewpoint.

2. The method of claim 1, wherein the received selection of the second selected viewpoint of the second light field video frame of the second light field video sequence is generated by selecting a region of a displayed first light field video frame corresponding to the second viewpoint and/or using a swipe gesture indicating a direction and an amplitude corresponding to the second viewpoint.

3. The method of claim 1, wherein the first window is a main window, and the second window is a side window.

4. The method of claim 3, wherein a relative position of the main window and the side window is related to content of the first and second displayed light field video frames.

5. The method of claim 3, wherein the main window is of a size larger than a size of the side window and/or the main window is positioned closer to a center of a screen than the side window.

6. The method of claim 3, wherein the first and/or the second light field video frames are displayed all-in-focus.

7. The method of claim 3, wherein a focus plane of the first light field video frames and/or of the second light field video frames is selectable.

8. An apparatus configured to provide a transition between two light field videos, comprising:
a receiving unit configured to receive light field video data from two light field video sequences having temporally synchronized video frames, each video frame comprising multiple selectable viewpoints;
an operation unit configured to provide for display, in a first window, temporally subsequent first light field video frames of a first light field video sequence from said two light field video sequences, each of said first light field video frames comprising multiple selectable first viewpoints of said first light field video sequence;
said operation unit being further configured to provide for display, in a second window, temporally subsequent second light field video frames of a second light field video sequence from said two light field video sequences, each of said second light field video frames comprising multiple selectable second viewpoints of said second light field sequence;
an input unit configured to receive an input indicating a selection of a first viewpoint of a displayed first light field video frame of said first light field video sequence;
said input unit being further configured to receive an input indicating a selection of a second viewpoint of a displayed second light field video frame of said second light field video sequence, said selected second viewpoint not being in proximity of said selected first viewpoint; and
wherein, in response to the selection of the second viewpoint, the operation unit is configured to provide for display, in the first window, temporally subsequent light field video frames of the first light field sequence with a changing first viewpoint until a first viewpoint of said first light field video sequence in close viewpoint proximity of the second viewpoint of said second light field sequence, and providing for display, in the first window, light field frames of the second light field video sequence.

9. The apparatus of claim 8, further comprising a storage unit configured to store the received light field video data.

10. A non-transitory computer readable storage medium having stored therein instructions enabling displaying light field video data, which, when executed by a computer, cause the computer to:
receive light field video data from two light field video sequences having temporally synchronized video frames, each video frame comprising multiple selectable viewpoints;
display, in a first window, temporally subsequent first light field video frames of a first light field video sequence from said two light field video sequences, each of said first light field video frames comprising multiple selectable first viewpoints of said first light field video sequence;
display, in a second window, temporally subsequent second light field video frames of a second light field video sequence from said two light field video sequences, each of said second light field video frames comprising multiple selectable second viewpoints of said second light field video sequence;
receive a selection of a first viewpoint of a displayed first light field video frame of said first light field video sequence;
receive a selection of a second viewpoint of a displayed second light field video frame of said second light field video sequence, said selected second viewpoint not being in viewpoint proximity of said selected first viewpoint; and
in response to the selection of the second viewpoint, display in the first window, temporally subsequent light field video frames of the first light field sequence with a changing first viewpoint until a first viewpoint of said first light field video sequence is in viewpoint proximity of said second light field video sequence, and displaying, in the first window, temporally subsequent light field frames of the second light field video sequence with the second viewpoint.

11. A method of transitioning between multiple light field video sequences, each light field video sequence comprising temporally synchronized video data from at least two viewpoints in the respective video sequence, the method comprising:
displaying, in a first window, video data corresponding to an initial viewpoint of a first light field video sequence;
displaying, in a second window, video data corresponding to viewpoints of a second light field video sequence;
receiving a selection of a desired viewpoint of the second light field video sequence displayed in the second window, wherein the selected desired viewpoint is not in viewpoint proximity to the initial viewpoint of the first light field video sequence;
in response to the selection of the desired viewpoint, displaying in the first window, temporally subsequent video data corresponding to alternate viewpoints of the first light field video sequence until the displayed video data of the first light field video sequence corresponds to a viewpoint that is in viewpoint proximity to the selected desired viewpoint of the second light field video; and displaying in the first window, temporally subsequent video data corresponding to the selected desired viewpoint of the second light field video sequence.

* * * * *